Sept. 22, 1931.  G. R. RICH  1,823,953
GAS METER
Filed Jan. 24, 1930  3 Sheets-Sheet 1

Inventor:
George R. Rich,
by Charles O. Shurvey,
his Atty.

Sept. 22, 1931.  G. R. RICH  1,823,953
GAS METER
Filed Jan. 24, 1930   3 Sheets-Sheet 2
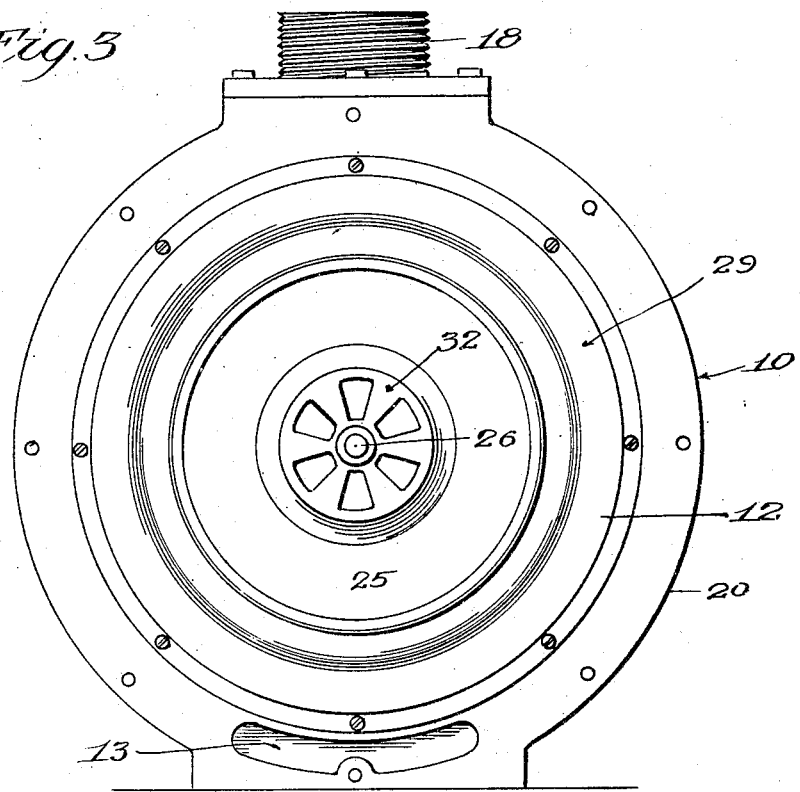
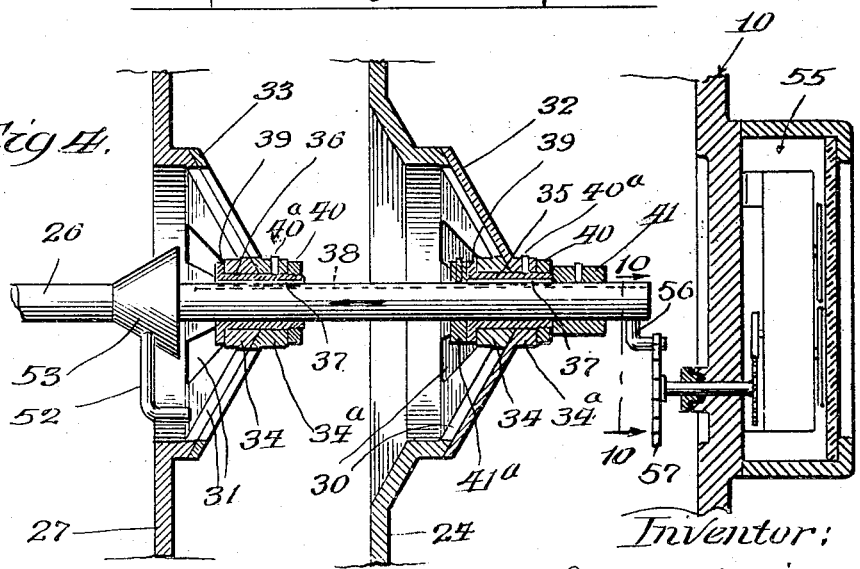
Inventor:
George R. Rich,
by Charles O. Shurvey
his Atty Sept. 22, 1931. G. R. RICH 1,823,953
GAS METER
Filed Jan. 24, 1930 3 Sheets-Sheet 3
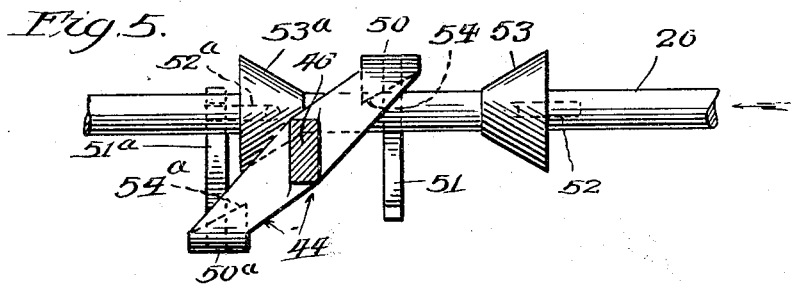
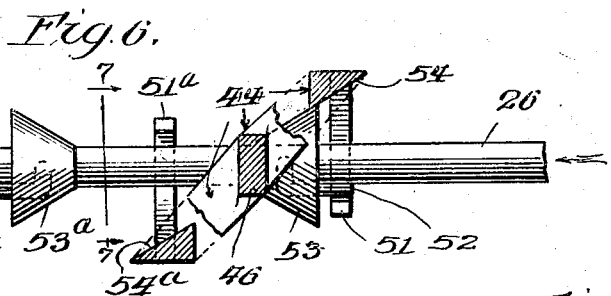
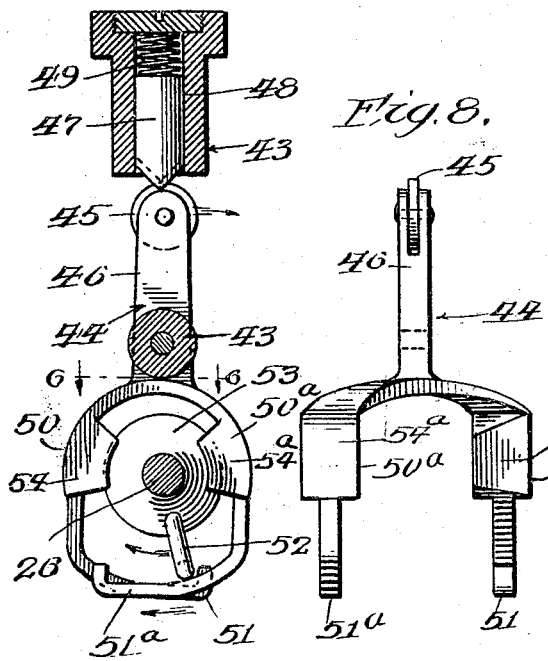
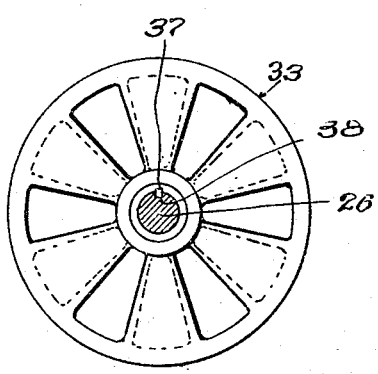
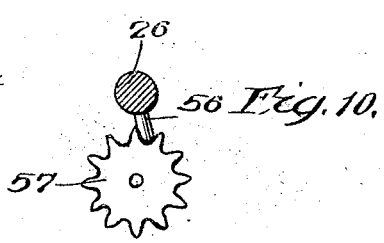
Inventor:
George R. Rich,
by Charles O. Shurley
his Atty.

Patented Sept. 22, 1931

1,823,953

UNITED STATES PATENT OFFICE

GEORGE R. RICH, OF PASADENA, CALIFORNIA

GAS METER

Application filed January 24, 1930. Serial No. 422,972.

This invention relates to gas meters, and its principal object is to simplify and otherwise improve upon the construction thereof. Another object is to provide valve controlled enlarging and contracting chambers, such as bellows, in a gas meter, operated by the gas pressure for measuring the quantity of gas passing through the meter and having valve actuating mechanism operating to hold the valves fully open or closed, as the case may be, during the entire or substantially the entire periods of expansion and contraction of the bellows. Another object is to provide quick acting means for operating the valves in combination with setting or tripping mechanism for the valve operating means.

With these and other objects and advantages in view, this invention consists in a gas meter having a pair of enlarging and contracting chambers, such as bellows, each having a valve controlled gas inlet port through its movable wall connected with a gas source and a valve controlled discharge port through its stationary wall communicating with a common gas discharge passage, one bellows being arranged to collapse under gas pressure coming from the source and expel the gas from said bellows while the other bellows is in the act of expanding and admitting a charge of gas, both bellows being connected by a connecting medium, such as a shaft or rod, whereby the collapsing action of one bellows is utilized to obtain the expanding action of the other bellows.

It further consists in a gas meter, as above described, in which the connecting medium between the bellows operates to set or trip the valve actuating mechanism, whereby as a result thereof the two bellows are expanded alternately and collapsed alternately, the one taking in a charge of gas while the gas is being expelled from the other bellows. It further consists in a gas meter, as above described, characterized by a quick acting valve mechanism, whereby the valves may remain fully open or closed, as the case may be, during the entire or substantially the entire expanding and collapsing action of the bellows.

It further consists in a gas meter, as above described, in which the connecting element between the two bellows acts as the actuating means for a register of conventional form, whereby an indication is given of the quantity of gas passing through the meter.

The invention further consists in the several novel features of construction, arrangement and combination of parts hereinafter fully set forth and claimed.

The invention is clearly illustrated in the drawings accompanying this specification in which—

Fig. 3 is an end elevation of the meter looking in the direction of the arrow 3 in Fig. 1 with one section of the casing removed to show parts that otherwise would be hidden from view;

Fig. 4 is a fragmentary detail vertical longitudinal section illustrating the valve mechanism for one of the bellows and the meter actuating element;

Fig. 5 is a detail view, partly in plan and partly in horizontal section of the valve actuating mechanism taken on the line 5—5 of Fig. 2, showing the parts in the position occupied when the valves have just been actuated;

Fig. 6 is a view similar to Fig. 5, but showing the parts in a position where the valve operating lever has been set into the position seen in Fig. 7;

Fig. 7 is a view similar to Fig. 2, but showing the lever in the position occupied when set into position ready to be swung over to actuate the valves;

Fig. 8 is a detail side elevation of the valve actuating lever shown in Fig. 7;

Fig. 9 is a detail side elevation of one of the valves; and

Fig. 10 is a detail view of the register actuating means, the view being partly in end elevation and partly in cross section taken on the line 10—10 of Fig. 4.

Figure 1:
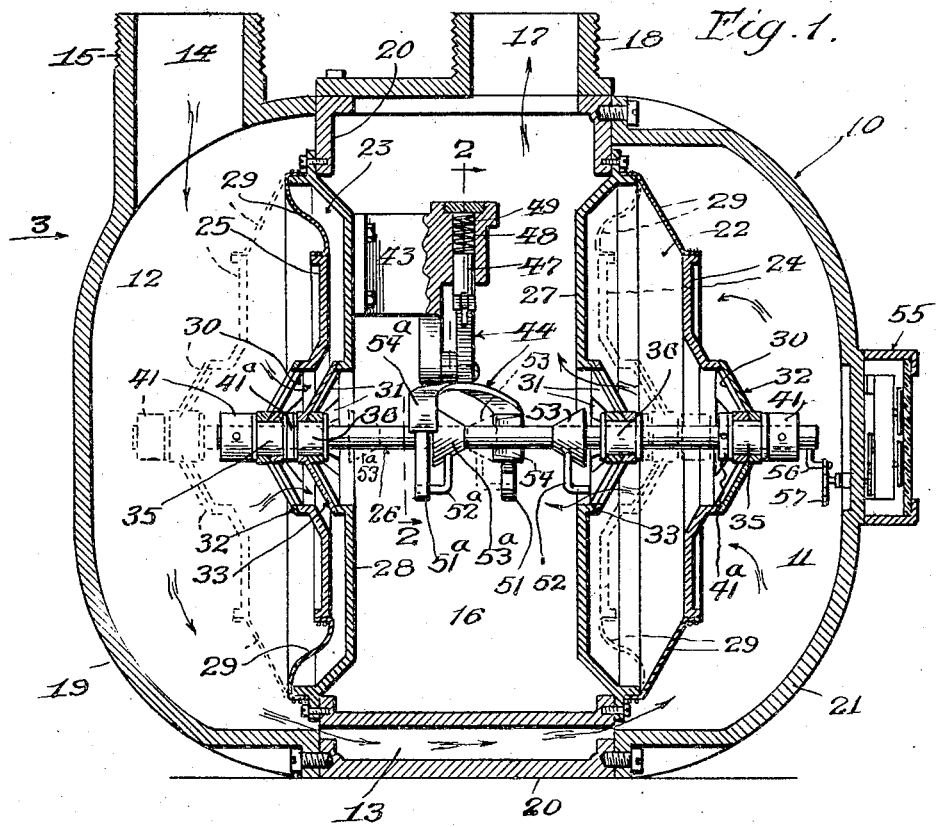
Figure 1 is a vertical longitudinal section through a gas meter embodying a simple form of the present invention.

Referring to said drawings which illustrate one embodiment of the present invention, the reference character 10 designates a case in which the operating mechanism is contained, and said case contains two intercommunicating gas inlet chambers 11 and 12 connected by a passageway 13. A gas inlet 14 in a threaded nipple 15 opens to said chambers and is adapted for connection with the gas supply pipe of the establishment where the meter is used. The intercommunicating chambers 11 and 12 are in the nature of a gas inlet passage to the enlarging and contracting chambers or bellows hereinafter described.

Between the two gas inlet chambers 11 and 12 is a gas discharge passage or chamber 16 having a discharge outlet 17 formed by a threaded nipple 18 adapted for connection with the service pipe of the establishment in which the meter is contained, as is well understood. The usual gas burners (not shown) are connected to the service pipe and are supplied with the gas that passes through the meter. The case wall of the meter is shown as formed of three sections 19, 20 and 21, flanged and bolted together, although this construction is not material to the invention broadly considered.

Interposed between each gas inlet chamber of the gas inlet passage and the gas discharge passage, and having valve controlled ports leading to and from said passages are enlarging and contracting chambers 22 and 23, such as bellows or the like, the movable walls 24 and 25 of which are connected to move in unison by a reciprocating and rotatory shaft or rod 26. The walls 27 and 28 of both bellows are stationary, and, as shown, are bolted to the middle section 20 of the case.

The stationary walls of the bellows are preferably of dished disk-like formation, and the edge portions of the walls of each bellows are connected by flexible walls 29, preferably formed of fabric impregnated with a suitable composition which rendered them impervious to gas. The flexible walls 29 are fastened to the stationary and movable walls of the bellows by tying them upon their marginal edges or by any other suitable fastening means. The two walls of each bellows are shown as formed with conical middle portions in which are ports 30 and 31 disposed around the center of the conical wall, and said ports are controlled by rotary valves 32 and 33, here shown in the form of conical disks having openings therein which are adapted to be brought into and out of register with the ports 30 and 31 in the conical walls of the bellows. The valves 32 and 33 are connected to the shaft or rod 26 so as to rotate therewith, and means are provided for imparting a partial rotation to said shaft or rod at the ends of its strokes to thereby open or close the ports 30 and 31, as the case may be. The connections between the shaft or rod 26 and the movable walls of the two bellows and the valves will now be described.

At the center of each bellows wall, the latter is formed with a hub-like part 34 (see Fig. 4) and at the center of each valve, the latter is formed with a hub-like part $34^a$. Between the shaft 26 and said hub-like parts are bushings 35 and 36 each of which is connected with the shaft so as to rotate therewith, as, for instance, by a feather or spline 37 that enters a groove 38 in the shaft. Each bushing is formed with a flange 39 at one end and a threaded part at the other end upon which is secured a nut 40. The hubs of the bellows walls and valves are confined between said flanges and nuts and the valves are thereby continuously held in close contact with said bellows walls. It is to be understood that the contacting faces of the bellows walls and valves are suitably machined to provide a close fit therebetween to prevent leakage.

The bushings are capable of rotating in the hubs of the bellows walls, but are fastened to the hubs of the valves as by pins $40^a$, whereby the rotary movement of the shaft is imparted to the valves through the bushings. To positively connect the movable walls of the bellows and their associated valves with the shaft 26, collars 41 and $41^a$ may be pinned to the shaft 26 at both ends of the bushings 35. It will be understood that the shaft reciprocates through the stationary walls 27 and 28 and their bushings 36.

From the above it will be apparent that the movable bellows walls are connected together by the shaft 26 so as to move in unison, movement of one bellows wall to the other being transmitted through the shaft 26 and its connections with said movable walls. Furthermore, that all of the valves are actuated by the shaft 26 as a result of the partial rotation thereof. With the parts in the position shown in Fig. 1, the valve 32 of the bellows 22 is closed and the valve 33 thereof is open; the valve 32 of the other bellows 23 is open and the valve 33 thereof is closed. Consequently, when the movable wall 24 of the bellows 22 is moved toward the left, as viewed in Fig. 1, the gas contained in said bellows 22 is discharged therefrom through the open ports 31 into the common gas discharge passage 16 and simultaneously a measured quantity of gas is taken into the bellows 23 through the open ports 30 thereof, and this operation is reversed when the bellows wall 25 of the bellows 23 is moved in the opposite direction to the one just described.

The collapsing action of the bellows and the corresponding expanding action of the companion bellows is effected by the pressure of the gas against the closed movable wall of the collapsing bellows whenever the gas is free to escape from the discharge passage 16. This occurs when the gas is turned on at any one or more of the burners connected with the service pipe. Means are provided for actuating the valves 32 and 33 at the ends of the strokes of the shaft 26, so as to obtain the reciprocating action of the two movable walls of the bellows and the resultant alternate collapsing and expanding action of the bellows, and said valve actuating mechanism will now be described. As has been explained, the opening and closing of the valves is directly caused by the partial rotation of the shaft 26, which rotary movements of the shaft are produced by a spring actuated valve operating lever.

Figure 2:
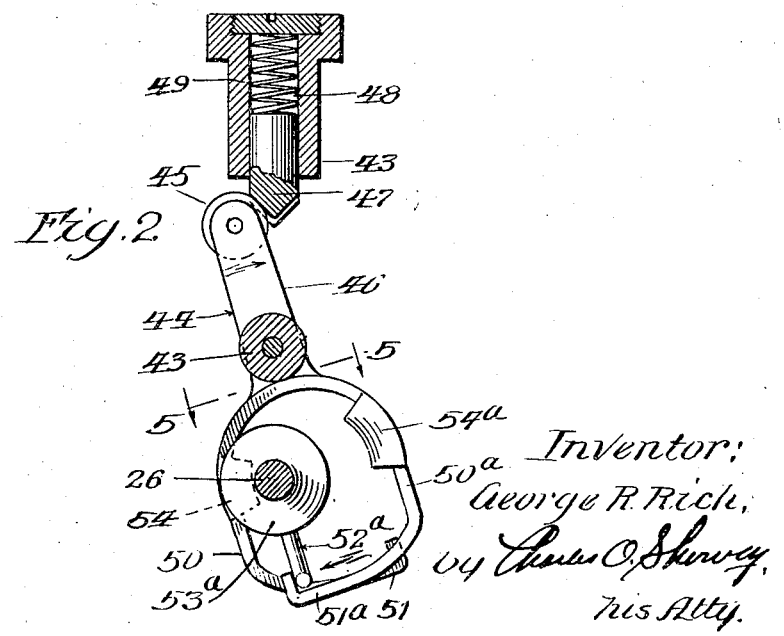
Fig. 2 is a detail vertical cross section of certain valve actuating mechanism taken on the line 2—2 of Fig. 1.

Fulcrumed upon a bracket 43 suitably supported within the gas discharge passage 16, as, for instance, upon the stationary wall 28 of one of the bellows, is a valve actuating lever 44 which has a roller 45 at the end of one arm 46, which roller is engaged by a push pin 47 slidably mounted in a socket 48 formed in the bracket 43. A coiled compression spring 49 interposed between the inner end of the push pin 47 and a plug at the end of the socket 48 urges the push pin in a direction toward the roller 45. The effective end of the push pin is tapered or wedge shaped, as seen in Figs. 2 and 7, and the inclined faces thereof may be provided with a groove in which the roller 45 travels.

In the operation of the meter, the valve actuating lever 44 is first swung upon its fulcrum from an inactive position by the shaft 26, and as the roller 45 rides along an inclined face of the tapered end of the push pin, the roller depresses the push pin until the roller passes the peak or apex of the push pin, whereupon the spring behind the push pin forces the push pin outwardly, thereby swinging the lever 44 through the remainder of its stroke. The other end of the lever 44 is forked as at 50 and 50$^a$, the fork extending at an acute angle to the shaft 26 and straddling the same, and extending from the two forks are fingers 51 and 51$^a$, the effective ends of which are arranged to encounter pins or other projections 52 and 52$^a$ that extend from the shaft 26 into positions to be acted upon by said fingers 51 and 51$^a$ at the ends of the strokes of the shaft. The fingers act to swing the pins 52 and 52$^a$ and therewith partially rotate the shaft 26 and the valves 32 and 33, thereby opening and closing the ports through the enlarging and contracting chambers.

The shaft 26 operates, at the ends of its strokes, to swing the lever 44 from its inactive position to one where the spring pressed push pin completes its movement to thereby actuate the valves. One form of lever setting means comprises two cams 53 and 53$^a$ which are rigidly mounted on the shaft 26. The two cams are here shown in the form of tapered collars. Said cams are spaced apart center to center a distance equal to the travel of the shaft 26 and are arranged to co-operate with cam shoes 54 and 54$^a$ on the forks of the valve operating lever 44 to swing said lever from an inactive position (one of which is shown in Fig. 2) past a neutral position where the roller 45 of the lever rides over the peak of the push pin 47, such a position being indicated in Fig. 7.

As viewed in Figs. 1 and 5, the cam shoe 54 is arranged to be engaged by the cam 53 at the end of the strokes of the shaft when moved toward the left, and the cam shoe 54$^a$ is arranged to be engaged by the cam 53$^a$ at the ends of the strokes of the shaft 26 when moved towards the right. It will be observed that during the greater portion of the strokes of the shaft in either direction, the cams 53 and 53$^a$ travel idly, but at either end of the strokes of the shaft, one of the cams engages with the associated cam shoe and swings the valve operating lever into a position where the roller passes the peak or apex of the push pin. This action serves to set the valve operating lever into a position where the spring pressed push pin completes its swinging movement, during which time one of the fingers 51 or 51$^a$ engages with its associated pin 52 or 52$^a$ and partially rotates the shaft 26 in a direction to reverse the prior position of the valves. The swinging movement of the valve operating lever caused by the action of the spring pressed push pin 47 upon the roller 45 is very rapid, and, consequently, the valves are actuated almost instantaneously.

A register 55 of conventional form is provided for registering the volume of gas passing through the meter, which register may be secured upon the outer face of the case wall of the meter in any suitable manner. Any suitable actuating mechanism may be provided between some movable element of the meter mechanism and the register for operating the latter and thereby indicate the amount of gas used. Conveniently, a crank arm 56 may be provided on the shaft 26 in position to engage and partially rotate a star wheel 57 which may comprise the prime mover of the register mechanism. The crank arm 56 is arranged to enter a space between two teeth of the star wheel 57 as the shaft 26 reaches the end of its stroke towards the right, as viewed in Figs. 1 and 4, and the partial rotation of the shaft 26 at said end of its strokes causes the crank arm 56 to partially rotate the star wheel. By calculating the volume of the gas displaced by the bellows during each cycle of operation of the meter, the proportions and the number of teeth required on the star wheel may be readily determined.

It will be observed that each movable wall of the bellows acts as a diaphragm (when its ports are closed) between the gas inlet chamber and the gas discharge chamber, and that when no gas is flowing through the meter, the pressure on both sides of the diaphragm is balanced. When gas is allowed to escape from the gas discharge passage, the pressure therein is reduced, and, consequently, overbalanced by the pressure in the gas inlet chamber. Consequently, the diaphragm is caused to move in a direction to collapse the bellows (of which it constitutes a part) by the greater pressure contained in the gas inlet chamber.

In the operation of the meter, when no gas is flowing through the same, the parts remain idle. When the gas is turned on at any burner on the service pipe leading from the meter, the pressure of gas against the movable bellows wall, whose valve happens to be closed, overbalances the pressure on the discharge side of that bellows and moves that closed bellows wall towards its companion stationary wall, thereby collapsing said bellows and discharging the gas therefrom through the open ports 31 of said bellows into the common discharge passage 16 from which the gas passes on through the open burner. Figs. 1 to 5, inclusive, show the parts in the position occupied when the closed wall 24 of the full bellows 22 is about to commence its movement towards the left.

As said closed bellows wall moves toward the collapsed position of its bellows, said moving wall moves the shaft 26 in the same direction of movement, thereby moving the movable wall of the other bellows 23 in the same direction, and since the valve 32 over the ports 30 of the movable wall 25 are open and the valve 33 over the ports 31 of the stationary wall 28 are closed, gas contained in the gas inlet passage 12 rushes into the expanding bellows 23 and fills the same to its full capacity. During the greater part of said stroke of the shaft toward the left, the cams 53 and 53ª travel idly, but as the collapsing bellows 22 finally reaches its collapsed condition and the expanding bellows 23 reaches its completely expanded position, the cam 53 encounters the cam shoe 54 on the fork 50 of valve operating lever 44 (see Fig. 6) and swings said lever part way over moving the arm 46 and therewith the roller 45 past the peak or apex of the tapered end of the push pin 47 (see Fig. 7), whereupon the effective end of the finger 51 encounters the pin 52, and the roller having passed the peak of the tapered end of the push pin, the spring behind the push pin forces the latter down and swings the valve operating lever through the remainder of its stroke, whereupon the finger 51 swings the pin 52 over and therewith partially rotates the shaft 26 which in turn partially rotates all of the valves, thereby reversing their previous positions, so that the valve 32 of the movable wall 24 of the bellows 22 (which was previously closed) is now open, the valve 33 of the stationary wall 27 of said bellows is open, the valve 32 of the movable wall 25 of the bellows 23 is closed, and the valve 33 of the stationary wall 28 is open.

The ports in the movable wall 25 of the bellows 23 being closed, the gas pressure in the gas inlet chamber 12 urges said wall 25 in the opposite direction to the one in which it has just moved, thereby expelling gas from the bellows 23 into the gas discharge passage 16, and, at the same time, the shaft 26 is moved with said movable wall 25 and therewith moving the movable wall 24 of the other bellows 22 away from the stationary wall 27 thereof, thereby expanding said bellows 22 and causing a measured quantity of gas to flow into said expanding bellows 22. At the end of this stroke of the shaft, the valve operating lever 44 is again actuated, as above described, except that it is moved in the opposite direction to the previous one and, as a consequence, the valves are returned to their former position wherein the gas pressure acts on the closed movable wall 24 of the expanded bellows 22 to again collapse said bellows and to expand the other bellows 23.

The reciprocating motions of the moving bellows walls and shaft, and the shifting of the valves at the ends of the strokes of the shaft 26, continue indefinitely until the flow of gas is shut off from the gas discharge passage of the meter, and the oscillating movements of the shaft are transmitted to the wheel 57 of the registering mechanism 55 through the crank arm 56, whereby the register is actuated and the quantity of gas used is registered therein.

More or less variation of the exact details of construction is possible without departing from the spirit of this invention. I desire, therefore not to limit myself to the exact form of the construction shown and described, but intend, in the following claims to point out all of the invention disclosed herein.

I claim as new, and desire to secure by Letters Patent:

1. In a gas meter, the combination of two oppositely acting bellows, each having a stationary wall and a pressure operated movable wall, there being inlet ports in the movable walls and outlet ports in the stationary walls, a reciprocatory shaft connecting said movable walls, whereby movement of one is transmitted to the other, valves for controlling the passages through said inlet and outlet ports, and valve actuating mechanism for said valves controlled from said shaft.

2. In a gas meter, the combination of a case having two intercommunicating gas inlet chambers forming a gas inlet passage and a gas discharge passage between said gas inlet chambers, two oppositely acting bellows, each having a stationary wall and a pressure operated movable wall, said bellows being interposed between and separating the said gas inlet chambers from said discharge passage, there being inlet ports in said movable walls and outlet ports in said stationary walls, a reciprocatory shaft connecting said movable walls, whereby movement of one is transmitted to the other, valves for controlling the passages through said ports, and valve operating mechanism for said valves controlled from said shaft.

3. A gas meter comprising in combination a case having a gas inlet passage and a gas discharge passage, two oppositely acting bellows, each having a stationary wall and a pressure operated wall, there being inlet ports in the movable walls and outlet ports in the stationary walls, said bellows being interposed between said gas inlet passage and said gas discharge passage, a rigid connection between said movable walls, whereby movement of one is transmitted to the other, valves for controlling the passages through said ports, valve actuating mechanism for said valves controlled by the rigid connection between said movable walls, and register actuating means operated by one of said movable walls.

4. A gas meter comprising in combination a case having a gas inlet passage and a gas discharge passage, two oppositely acting bellows, each having a stationary wall and a pressure operated movable wall, there being inlet ports in said movable walls and outlet ports in said stationary walls, said bellows being interposed between said gas inlet passage and said gas discharge passage, a rigid connection between said movable walls, whereby movement of the movable wall of one bellows is imparted to the movable wall of the other, valves controlling the passages through said inlet and outlet ports, valve actuating mechanism for said valves controlled by said rigid connection between the movable walls, and register actuating means operated by said rigid connection.

5. A gas meter comprising in combination a case having a gas inlet passage and a gas discharge passage, two oppositely acting bellows, each having a stationary wall and a pressure operated movable wall, there being inlet ports through said movable walls and outlet ports through said stationary walls, said bellows being interposed between said gas inlet passage and the gas discharge passage, a reciprocatory shaft connecting said movable walls, whereby movement of one movable wall is transmitted to the other movable wall, valves for controlling the passages through said inlet and outlet ports, valve actuating means for said valves, trip mechanism for initiating the operation of said valve actuating means, said trip mechanism being operated by said shaft, and register actuating means operated by a movable element of said mechanism.

6. A gas meter comprising in combination a case having a gas inlet passage and a gas discharge passage, two oppositely acting enlarging and contracting bellows-like chambers interposed between said gas inlet passage and gas discharge passage, each enlarging and contracting chamber having a pressure operated movable wall separating the gas inlet passage from the associated enlarging and contracting chamber, and a stationary wall separating said chamber from the discharge passage, a reciprocatory shaft connecting said movable walls, whereby movement of one movable wall is transmitted to the other movable wall, there being inlet ports in said movable walls connecting said gas inlet passage with the enlarging and contracting chambers and discharge ports in said stationary walls connecting said chambers with the gas discharge passage, valves for controlling said ports, valve actuating mechanism for said valves controlled by said reciprocatory shaft, and register actuating means operated by said shaft.

7. A gas meter comprising in combination a case having a gas inlet passage and a gas discharge passage, two oppositely acting enlarging and contracting bellows-like chambers interposed between said gas inlet passage and gas discharge passage, each enlarging and contracting chamber having a pressure operated movable wall separating the gas inlet passage from the associated enlarging and contracting chamber, and a stationary wall separating said chamber from the gas discharge passage, a reciprocatory shaft connecting said movable walls, whereby movement of one of said walls is transmitted to the other movable wall, there being inlet ports in said movable walls connecting said gas inlet passages with the enlarging and contracting chambers and discharge ports connecting said chambers with the gas discharge passage, valves for controlling the passages through said ports operatively connected with said shaft, valve actuating mechanism including said shaft, means carried by said shaft for setting said valve actuating mechanism into action, and register actuating means operated by said shaft.

8. A gas meter comprising in combination a case having a gas inlet passage and a gas discharge passage, two oppositely acting enlarging and contracting bellows-like chambers interposed between said gas inlet passage and gas discharge passage, each enlarging and contracting chamber having a movable wall separating the gas inlet passage from the associated enlarging and contracting chamber and a stationary wall separating said chamber from the discharge passage, a reciprocatory shaft connecting said movable walls, whereby movement of one movable wall is transmitted to the other movable wall, there being gas inlet ports in said movable walls connecting the gas inlet passage with the enlarging and contracting chambers and gas outlet ports in said stationary walls connecting said chambers with the gas discharge passage, rotary valves for controlling said ports, valve actuating mechanism including said reciprocatory shaft, means on said shaft co-operating with said valve actuating mechanism to set the same into action, and register actuating means operated by said shaft.

9. A gas meter comprising in combination a case having a gas inlet passage and a gas discharge passage, two oppositely acting bellows interposed between said gas inlet passage and said gas discharge passage, each bellows having a stationary wall and a movable wall, the movable walls being interposed between the gas inlet passage and the interior of the associated bellows, there being ports in said stationary and movable walls of the bellows, rotary valves for controlling said ports, a reciprocatory shaft connecting said movable walls, whereby movement of either movable wall is transmitted to the other movable wall, valve actuating mechanism including said shaft, means on said shaft operating to set said actuating mechanism into action, and register actuating mechanism operated by said shaft.

10. In a gas meter, two oppositely acting enlarging and contracting chambers, each having a stationary wall and a movable wall both provided with ports therein, valves for controlling the passages through said ports, a reciprocatory shaft connecting said movable walls, and valve actuating mechanism controlled by said reciprocatory shaft.

11. In a gas meter, the combination of a case having a gas inlet passage and a gas discharge passage, two oppositely acting bellows, each having a stationary wall and a pressure operated movable wall, each movable wall having inlet ports connecting said inlet passage with the interior of an associated bellows, each stationary wall having discharge ports connecting said bellows with the discharge passage, rotary valves controlling said ports, a reciprocatory and oscillatory shaft connecting the movable walls of the bellows and operatively connected to said valves, a forked valve operating lever, spring means actuating said lever, shaft rotating members carried by said shaft and arranged to be actuated by the forks of said forked lever, lever setting members carried by said shaft and arranged to move said lever into active position for actuation by said spring means, and register actuating means operated by said shaft.

12. In a gas meter, the combination of two oppositely acting bellows, each bellows having a stationary wall and a movable wall and there being ports in said stationary and movable walls, valves for controlling the passages through said ports, a reciprocatory and oscillatory shaft connecting said movable walls of the bellows and operatively connected to the valves for the ports, a forked oscillatory valve actuating lever, means for swinging said lever in opposite directions from a neutral position, cams on said shaft co-operating with said lever to move the latter past a neutral position, and coacting means between said lever and shaft for oscillating said shaft and therewith opening and closing the valves.

13. A gas meter comprising in combination two oppositely disposed bellows, each having a stationary wall provided with an outlet port, and a movable wall provided with an inlet port, rotary valves for controlling said ports, a reciprocatory and oscillatory shaft connecting said movable walls and operatively connected to said valves, a valve actuating lever having shaft turning means thereon, cams on said shaft arranged to engage said lever at the ends of the strokes of the shaft and to therewith move said lever from an inactive position past a neutral position, and spring means for swinging said lever from said neutral position and therewith partially rotating the shaft whereby the position of the valve is reversed.

14. In a gas meter, the combination of a bellows actuating reciprocatory and oscillatory shaft, a pivoted oscillatory valve actuating lever having cam shoes thereon, a spring pressed push pin engaging said lever and acting to move the same through the final limits of its strokes, and cams on said shaft, co-operating with the cam shoes on said lever to set said lever into active position so as to be acted on by said push pin.

15. In a gas meter, the combination of two oppositely acting bellows, each having a stationary wall and a movable pressure operated wall provided with inlet and outlet ports therein, valves for controlling the passages through said ports, and valve actuating mechanism including a reciprocatory shaft connecting said movable walls.

16. In a gas meter, the combination of stationary and a movable walls of a bellows having inlet and outlet ports, rotary valves for controlling said ports, a reciprocatory and rotary shaft, means for turning the shaft, an operative connection between said movable wall and shaft whereby said movable wall and shaft move together in a direction lengthwise of the shaft, and an operative connection between said valves and shaft whereby the rotary movement of the shaft is transmitted to the valves.

17. In a gas meter, a valve actuating lever, having an arm on one side of its fulcrum and a fork on the other side of its fulcrum provided with shaft rocking fingers, in combination with a spring pressed push pin engaging said arm of the lever and acting to swing the same through final limits of its movement, a reciprocatory and rotary valve actuating shaft having means thereon arranged for engagement by said shaft rocking finger, and cams on said shaft arranged to engage said forks at the limits of its strokes, and thereby set said lever into active position to be acted on by the push pin.

18. In a gas meter, a gas moving bellows, having a stationary wall and a movable pressure operated wall, there being ports in said walls, rotary valves controlling said ports, one valve being open while the other is closed and vice versa, a reciprocatory and rotary shaft connected with said movable wall to move therewith in a direction lengthwise of the shaft, shaft rotating means, and a connection between said rotary valves and shaft whereby partial rotation of said shaft partially opens and closes said valves.

19. In a gas meter, gas moving bellows having a stationary wall and a movable pressure operated wall, there being ports in said walls, rotary valves controlling said ports, one valve being open while the other is closed, and vice versa, a reciprocatory and rotary shaft extending through said walls, bushings non-rotatably mounted on said shaft, one between said shaft and the stationary wall and its valve and one between said shaft and the movable wall and its valve, the shaft being movable lengthwise through the bushing for the stationary wall, the bushing for the movable wall being connected with the shaft for lengthwise movement therewith, and means for rigidly connecting the valves with their respective bushings.

20. A gas meter having a case containing two inlet chambers and a gas discharge passage therebetween, in combination with two oppositely acting bellows separating said gas inlet chambers from said gas discharge passage, said bellows having stationary walls and movable walls provided with outlet and inlet ports, valves for controlling said ports, a shaft connecting the movable walls to move in unison, and valve actuating mechanism controlled from said shaft.

21. In a gas meter, the combination of two oppositely acting bellows, each having a stationary wall and a pressure operated movable wall, said walls having centrally located conical portions formed with ports therein, conical rotary valves for controlling said ports, a reciprocatory shaft connecting said movable walls, whereby movement of one is transmitted to the other, and valve actuating mechanism for the valves controlled from said shaft.

GEORGE R. RICH.